(12) United States Patent
Kanai

(10) Patent No.: US 6,577,449 B1
(45) Date of Patent: Jun. 10, 2003

(54) TELESCOPIC ZOOM LENS SYSTEM

(75) Inventor: Moriyasu Kanai, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/488,680

(22) Filed: Jan. 21, 2000

(30) Foreign Application Priority Data

Jan. 22, 1999 (JP) .......................................... 11-014591

(51) Int. Cl.$^7$ ........................ G02B 15/14; G02B 23/00; G03B 13/06
(52) U.S. Cl. ...................... 359/676; 359/686; 359/691; 359/422; 359/421; 359/432
(58) Field of Search ................................ 359/422, 421, 359/432, 676, 686, 691

(56) References Cited

U.S. PATENT DOCUMENTS

| | | | |
|---|---|---|---|
| 4,779,969 A | * 10/1988 | Sato et al. | ................. 359/676 |
| 5,117,247 A | 5/1992 | Nakai et al. | |
| 5,151,820 A | * 9/1992 | Sillitto | ........................ 359/354 |
| 5,621,568 A | 4/1997 | Hasushita et al. | .......... 359/432 |
| 5,625,487 A | 4/1997 | Hasushita et al. | .......... 359/432 |
| 5,734,509 A | 3/1998 | Ueno | |
| 5,970,266 A | * 10/1999 | Takato | ........................ 396/379 |
| 6,084,720 A | * 7/2000 | Kashiki | ....................... 359/676 |

\* cited by examiner

Primary Examiner—Georgia Epps
Assistant Examiner—Jim Thompson
(74) Attorney, Agent, or Firm—Greenblum & Bernstein, P.L.C.

(57) ABSTRACT

A telescopic zoom lens system has a minimum magnification thereof is more than 2, and includes a positive objective lens group, and a positive eyepiece lens group, in this order from the object. Further, a zooming lens group which is made moveable along the optical axis upon zooming is positioned on the side of the object with respect to the primary image forming plane of the objective optical system.

19 Claims, 12 Drawing Sheets

Fig. 1
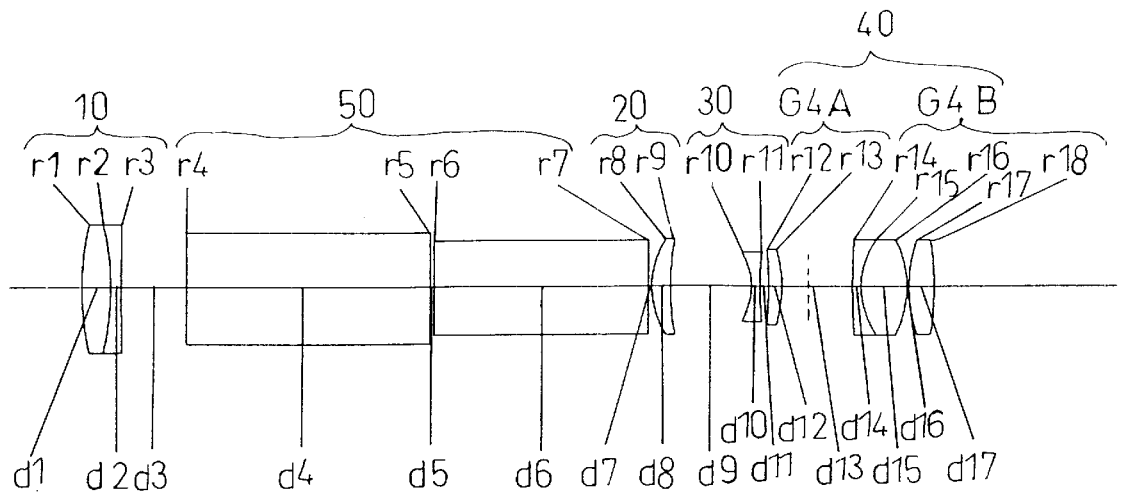
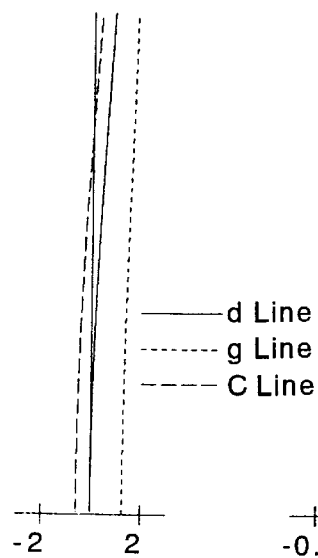
Fig.2A
ER 3.6
SPHERICAL
ABERRATION
CHROMATIC
ABERRATION
[diopter]
— d Line
---- g Line
---- C Line
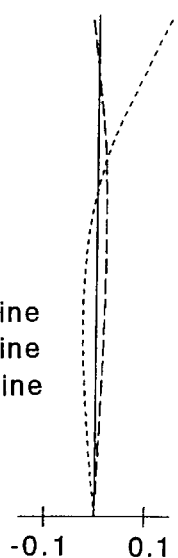
Fig.2B
B=24.5
LATERAL
CHROMATIC
ABERRATION
[degree]
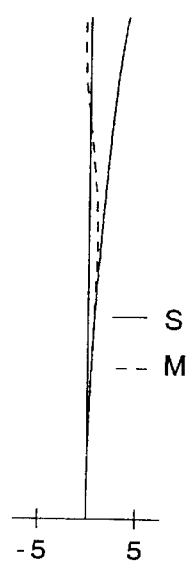
Fig.2C
B=24.5
ASTIGMATISM
[diopter]
— S
-- M
Fig.2D
B=24.5
DISTORTION Fig. 3
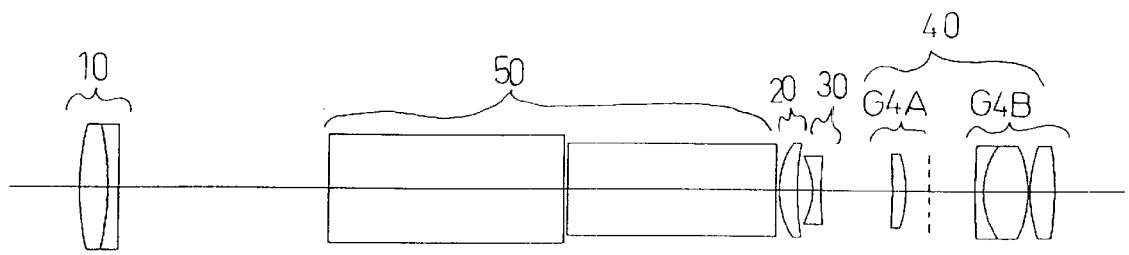
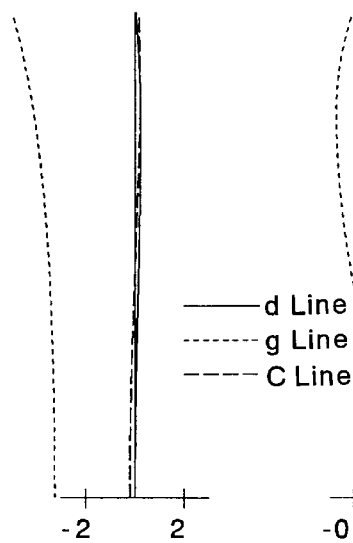
Fig.4A
ER 1.8
SPHERICAL
ABERRATION
CHROMATIC
ABERRATION
[diopter]
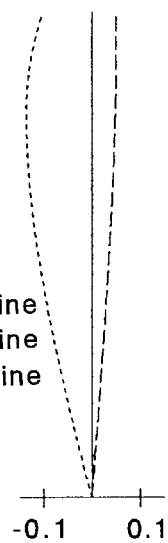
Fig.4B
B=24.5
—— d Line
------- g Line
---- C Line
LATERAL
CHROMATIC
ABERRATION
[degree]
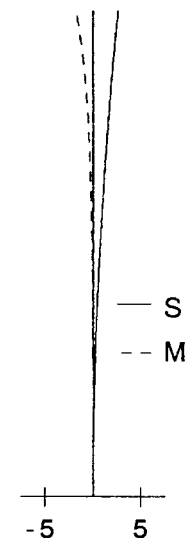
Fig.4C
B=24.5
—— S
-- M
ASTIGMATISM
[diopter]
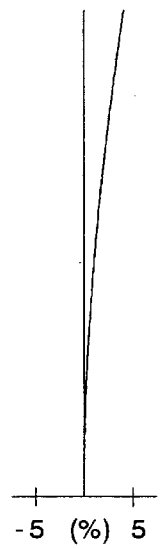
Fig.4D
B=24.5
DISTORTION Fig. 5
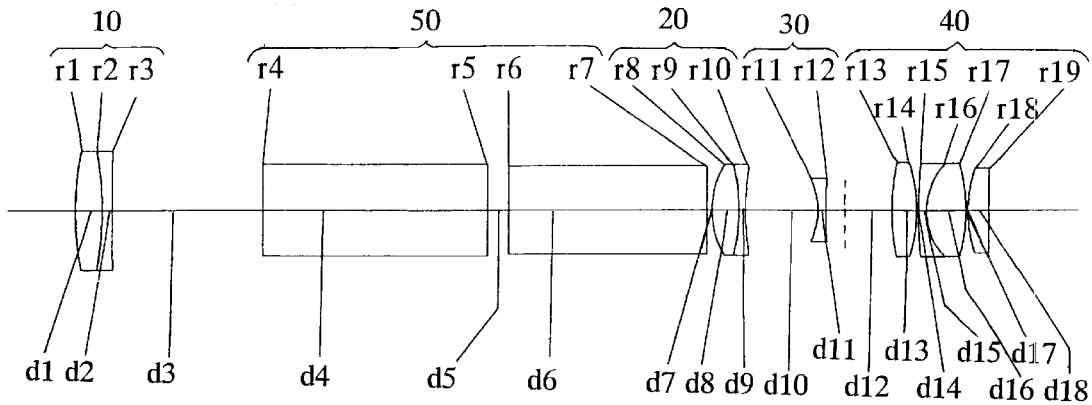
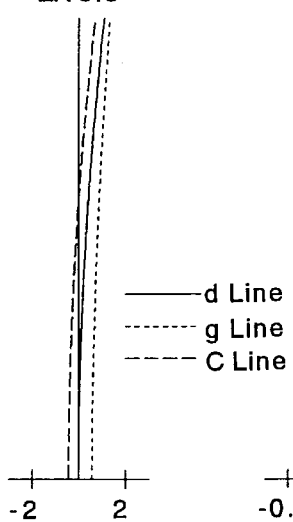
Fig.6A
ER 3.6
— d Line
------ g Line
----- C Line
-2   2
SPHERICAL
ABERRATION
CHROMATIC
ABERRATION
[diopter]
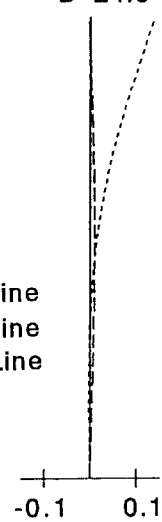
Fig.6B
B=24.0
-0.1   0.1
LATERAL
CHROMATIC
ABERRATION
[degree]
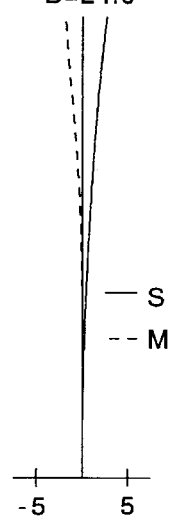
Fig.6C
B=24.0
— S
-- M
-5   5
ASTIGMATISM
[diopter]
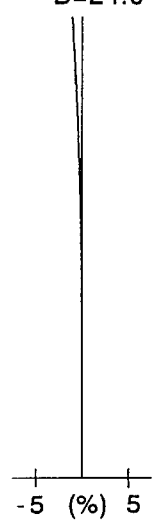
Fig.6D
B=24.0
-5 (%) 5
DISTORTION Fig. 7
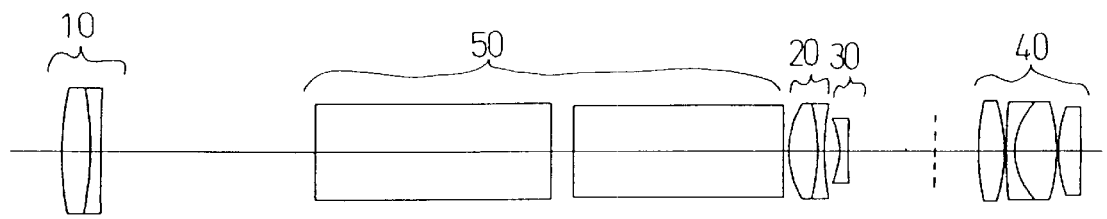
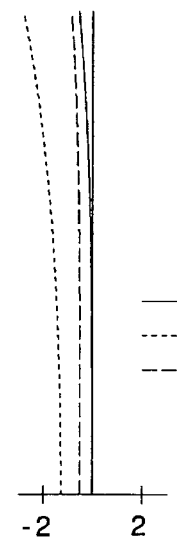
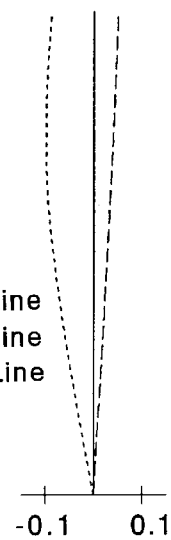
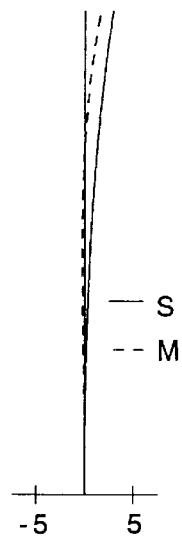
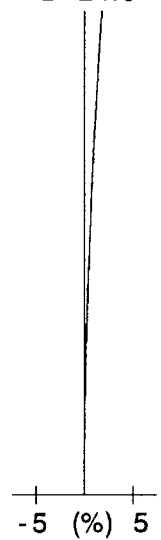
Fig.8A  ER 1.8  SPHERICAL ABERRATION CHROMATIC ABERRATION [diopter]
Fig.8B  B=24.0  LATERAL CHROMATIC ABERRATION [degree]
Fig.8C  B=24.0  ASTIGMATISM [diopter]
Fig.8D  B=24.0  DISTORTION

Fig. 11
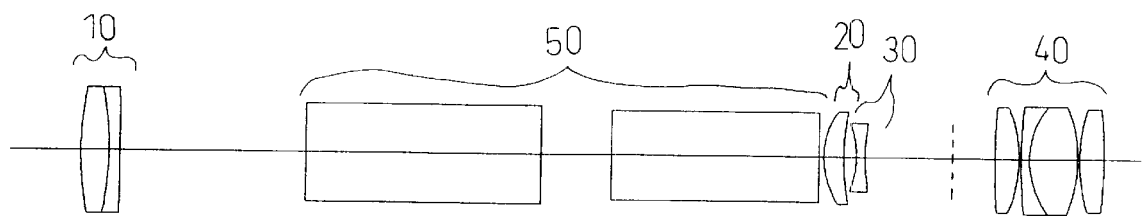
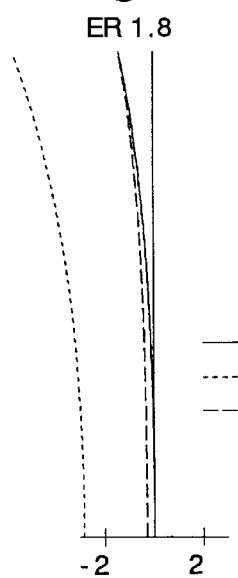
Fig.12A
ER 1.8
SPHERICAL
ABERRATION
CHROMATIC
ABERRATION
[diopter]
— d Line
······ g Line
— — C Line
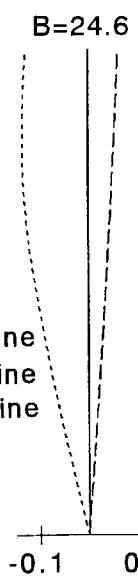
Fig.12B
B=24.6
LATERAL
CHROMATIC
ABERRATION
[degree]
Fig.12C
B=24.6
ASTIGMATISM
[diopter]
— S
— — M
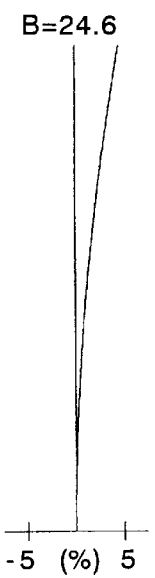
Fig.12D
B=24.6
DISTORTION

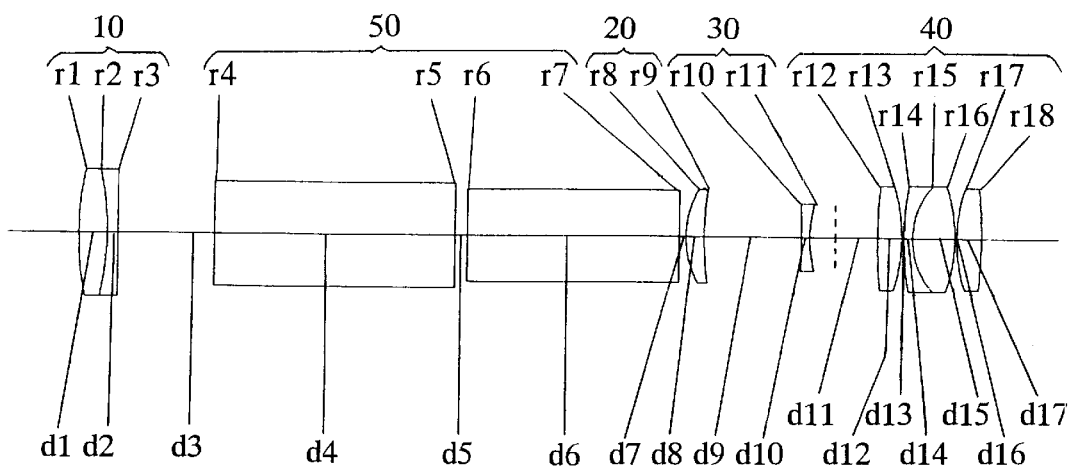
Fig. 13
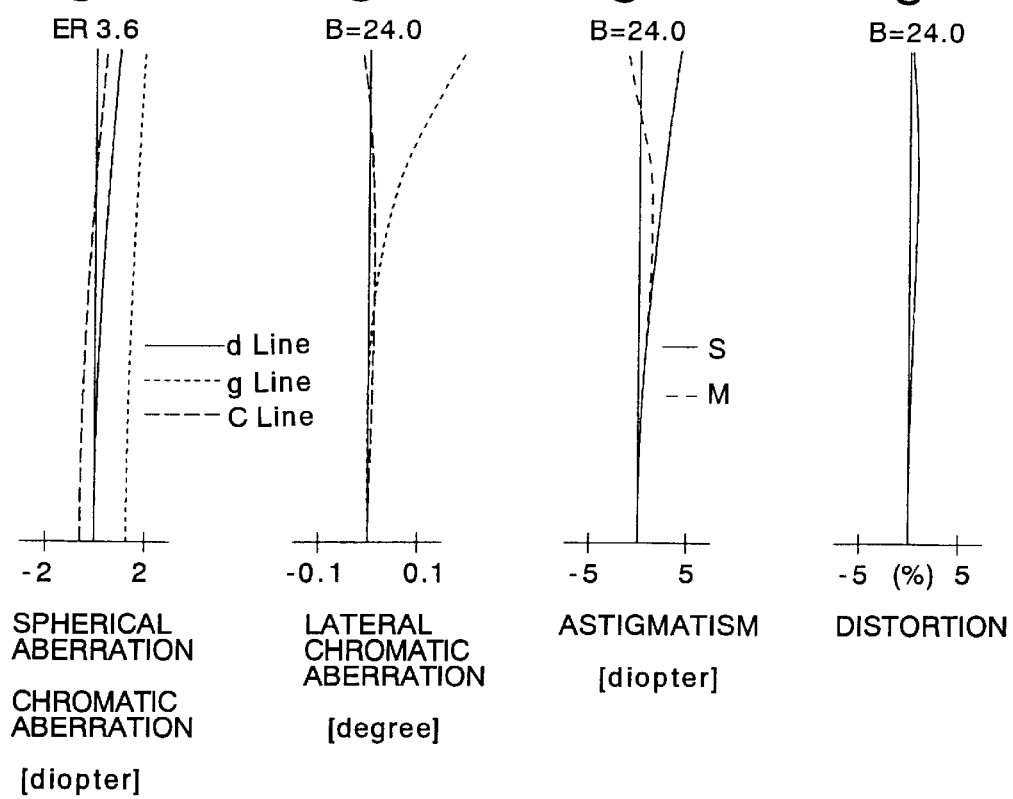
Fig. 14A ER 3.6 SPHERICAL ABERRATION CHROMATIC ABERRATION [diopter]
Fig. 14B B=24.0 LATERAL CHROMATIC ABERRATION [degree]
Fig. 14C B=24.0 ASTIGMATISM [diopter]
Fig. 14D B=24.0 DISTORTION Fig. 15
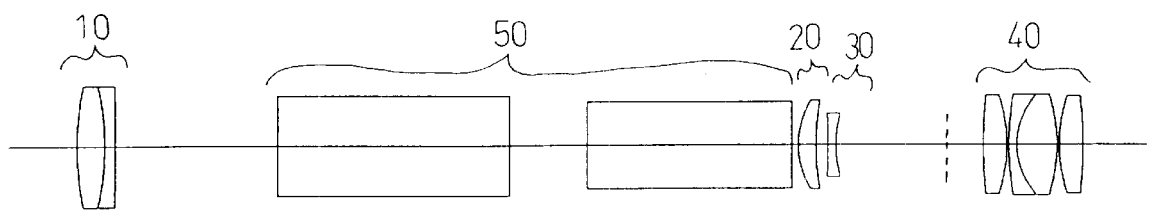
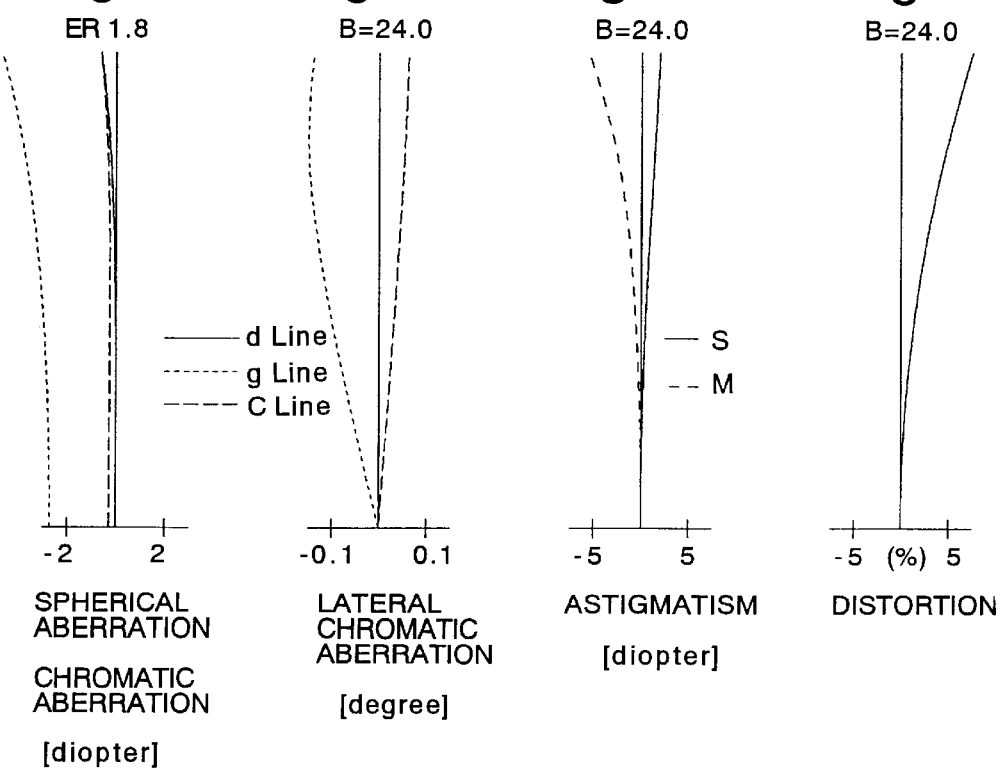
Fig.16A ER 1.8 — SPHERICAL ABERRATION CHROMATIC ABERRATION [diopter]
Fig.16B B=24.0 — LATERAL CHROMATIC ABERRATION [degree]
Fig.16C B=24.0 — ASTIGMATISM [diopter]
Fig.16D B=24.0 — DISTORTION

ER 2.2

-2   2

SPHERICAL
ABERRATION

CHROMATIC
ABERRATION

[diopter]

B=24.3

— d Line
----- g Line
----- C Line

-0.1   0.1

LATERAL
CHROMATIC
ABERRATION

[degree]

B=24.3

— S
-- M

-5   5

ASTIGMATISM

[diopter]

B=24.3

-5 (%) 5

DISTORTION

Fig. 19
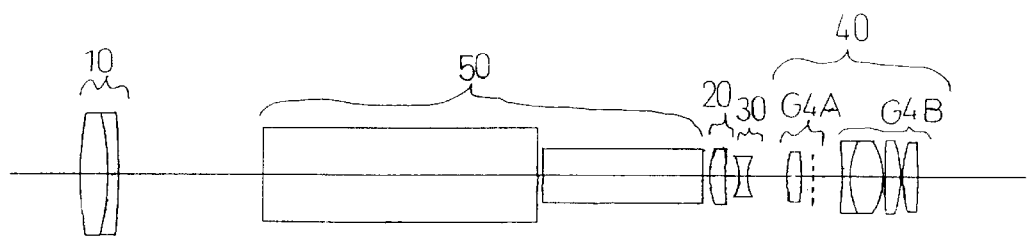
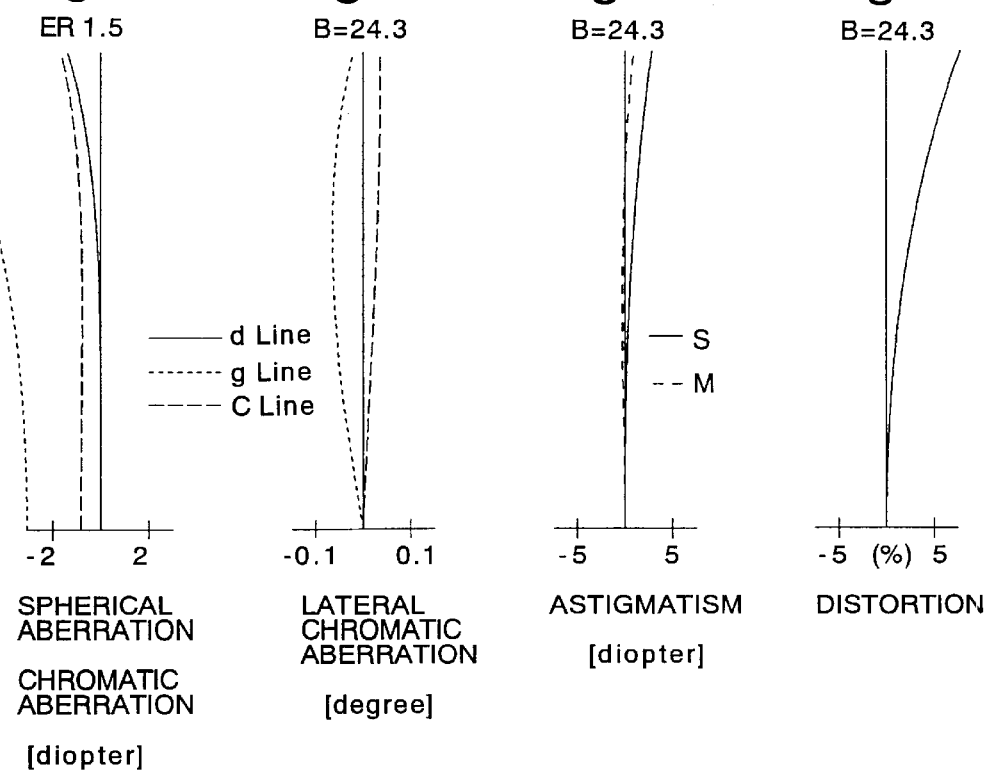
Fig.20A ER 1.5 SPHERICAL ABERRATION CHROMATIC ABERRATION [diopter]
Fig.20B B=24.3 LATERAL CHROMATIC ABERRATION [degree]
Fig.20C B=24.3 ASTIGMATISM [diopter]
Fig.20D B=24.3 DISTORTION

TELESCOPIC ZOOM LENS SYSTEM

BACKGROUND OF THE INVENTION

1. Field of the Invention

The present invention relates to a telescopic zoom lens system to be used in binoculars or telescopes.

2. Description of the Related Art

In zoom binoculars or zoom telescopes, it is preferable to secure a wider real field of view to obtain an entire view with backgrounds by setting the binoculars or telescopes at a lower magnification side, and to enlarge an operator's desired portion of the view by setting the binoculars or telescopes at a higher magnification side. As a zooming system in telescopes and binoculars, an OE-ZOOM lens system, in which a zooming lens group moveable along the optical axis is provided in both the objective optical system and the eyepiece optical system, is generally used. In the OE-ZOOM lens system, the eyepiece optical system which includes a zooming lens group is advantageously constituted by a smaller number of lens elements, e.g., five lens elements, while the overall length of the eyepiece optical system is made constant. However, since zooming is performed in the eyepiece optical system as well, the apparent field of view is varied accordingly. In the OE-ZOOM lens system disclosed in U.S. Pat. No. 5,734,509, the apparent field of view from a lower magnification side to a higher magnification side is about 40° to 50°. In particular, when a combination of the objective optical system and the eyepiece optical systems is considered, the apparent field of view at a lower magnification side (i.e., on the side of a longer focal length of the eyepiece optical system) is narrowed, and further, the real field of view is narrowed.

SUMMARY OF THE INVENTION

It is an object of the present invention to provide a telescopic zoom lens system in which the apparent field of view is not varied upon zooming.

In order to achieve the above-mentioned object, there is provided a telescopic zoom lens system in which a minimum magnification thereof is more than 2, and at least a positive objective lens group, and a positive eyepiece lens group are provided in this order from the object. Further, a zooming lens group which is made moveable along the optical axis upon zooming is positioned on the side of the object with respect to the primary image forming plane of the objective optical system. According to this arrangement, the apparent field of view is not varied upon zooming.

The telescopic zoom lens system according to the present invention at least includes, in the following order from the object, a positive first lens group, a positive second lens group and a negative third lens group which constitute the positive objective lens group; and a positive fourth lens group which constitutes the positive eyepiece lens group. The third lens group is the zooming lens group, while the first lens group is a diopter adjusting element and is made moveable along the optical axis in order to adjust the change in the diopter which is occurred when the third lens group is moved.

In the objective lens group, it is common to provide an erecting optical system which is constituted by a plurality of optical elements. In such a case, if the third lens group is a zooming lens group like the above, at least one optical element in the erecting optical system may be made moveable along the optical axis as a diopter adjusting element. For example, a triangle prism can be used as a diopter adjusting element in an erecting optical system.

Moreover, the first lens group is preferably made interchangeable. According to this arrangement, the telescopic zoom lens system can be used in astronomical telescopes.

The telescopic zoom lens system according to the present invention preferably satisfies the following conditions in order to reduce the change in the eye relief and to miniaturize the entire zoom lens system:

$$1.7 < |f2/f3| < 3.5 \tag{1}$$

$$0.4 < m2w \times m3w < 0.9 \tag{2}$$

wherein f2 designates the focal length of the second lens group;

f3 designates the focal length of the third lens group;

m2w designates the lateral magnification of the second lens group when the angular magnification of the entire zoom lens system is the minimum; and m3w designates the lateral magnification of the third lens group when the angular magnification of the entire zoom lens system is the minimum.

The third lens group can be constituted by a single lens element, and in such a case, the following condition is preferably satisfied:

$$0.7 < (m2t \times m3w)/(m2w \times m3t) < 1.3 \tag{3}$$

wherein m2t designates the lateral magnification of the second lens group when the angular magnification of the entire zoom lens system is the maximum; and m3t designates the lateral magnification of the third lens group when the angular magnification of the entire zoom lens system is the maximum.

In the case where the telescopic zoom lens system of the present invention is provided in binoculars, at least a part of either one of the fourth lens groups, which constitute a pair of the eyepiece lens groups, is preferably made to be a diopter-difference adjusting lens element which is moveable along the optical axis.

The present disclosure relates to subject matter contained in Japanese Patent Application No.Hei-11-14591 (filed on Jan. 22, 1999) which is expressly incorporated herein by reference in its entirety.

BRIEF DESCRIPTION OF THE DRAWINGS

The invention will be discussed below in detail with reference to the accompanying drawings, in which:

FIG. 1 is a lens arrangement of a first embodiment of a telescopic zoom lens system, at an angular magnification of 5, according to the present invention;

FIGS. 2A, 2B, 2C and 2D show aberration diagrams of the lens arrangement shown in FIG. 1;

FIG. 3 shows the first embodiment of the telescopic zoom lens system, at an angular magnification of 10;

FIGS. 4A, 4B, 4C and 4D show aberration diagrams of the lens arrangement shown in FIG. 3;

FIG. 5 is a lens arrangement of a second embodiment of a telescopic zoom lens system, at an angular magnification of 5, according to the present invention;

FIGS. 6A, 6B, 6C and 6D show aberration diagrams of the lens arrangement shown in FIG. 5;

FIG. 7 show the second embodiment of the telescopic zoom lens system, at an angular magnification of 10;

FIGS. 8A, 8B, 8C and 8D show aberration diagrams of the lens arrangement shown in FIG. 7;

FIG. 11 shows the third embodiment of the telescopic zoom lens system, at an angular magnification of 10;

FIGS. 12A, 12B, 12C and 12D show aberration diagrams of the lens arrangement shown in FIG. 11;

FIG. 13 is a lens arrangement a fourth embodiment of a telescopic zoom lens system, at an angular magnification of 5, according to the present invention;

FIGS. 14A, 14B, 14C and 14D are aberration diagrams of the lens arrangement shown in FIG. 13;

FIG. 15 shows the fourth embodiment of the telescopic zoom lens system, at an angular magnification of 10;

FIGS. 16A, 16B, 16C and 16D are aberration diagrams of the lens arrangement shown in FIG. 15;

FIG. 19 shows the fifth embodiment of the telescopic zoom lens system, at an angular magnification of 11.8;

FIGS. 20A, 20B, 20C and 20D show aberration diagrams of the lens arrangement shown in FIG. 19;

DESCRIPTION OF THE PREFERRED EMBODIMENTS

Figure 21:
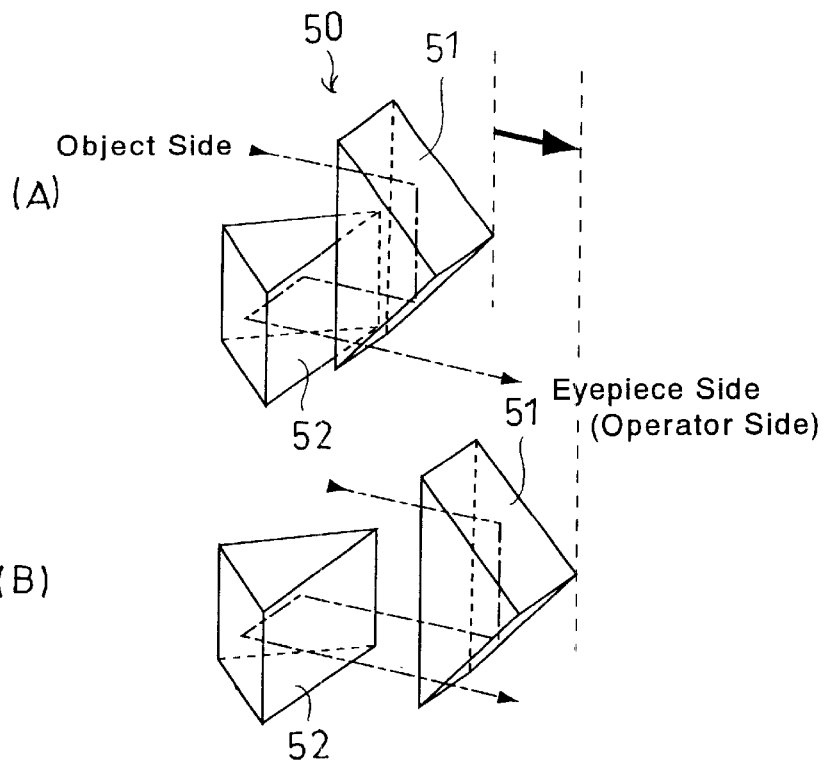
FIGS. 21A and 21B show positions of the triangle prisms which constitute the erecting optical system of a telescopic zoom lens system according to the present invention.

In the first embodiment shown in FIG. 1, the telescopic zoom lens system includes a positive first lens group 10, an erecting optical system 50, a positive second lens group 20, a negative third lens group 30, and a positive fourth lens group 40, in this order from the object. The first lens group 10, the erecting optical system 50, the second lens group 20 and the third lens group 30 constitute an objective lens group; and the fourth lens group 40 constitutes an eyepiece lens group. The erecting optical system 50 is, for example, constituted by two triangle prisms (right-angle prisms) 51 and 52, each of which has two reflection surfaces, as shown in FIGS. 21(A) and 21(B). Focusing can be performed by, for example, moving the first lens group 10 along the optical axis.

The third lens group 30 is positioned on the side of the object with respect to the primary image forming plane of the objective lens group, and constitutes a zooming lens group which is made moveable along the optical axis. Positioning and functioning the third lens group 30 as explained can be materialized by the following factors:

(i) the positive-positive-negative lens group arrangement of the objective lens group, in this order from the object; and (ii) the negative lens group being arranged to be a zooming lens group.

In other words, zooming is not performed by a lens element in the eyepiece lens group, but by the zooming lens group in the objective lens group, and thereby the apparent field of view is made constant upon zooming.

The OE-ZOOM lens system of the prior art has a positive-negative-positive-positive lens group arrangement, in this order from the object, and the negative lens group and the intermediate positive lens group are arranged to be moveable zoom lens groups. The primary image forming plane of the objective lens group is formed between the negative and the intermediate positive lens groups. Therefore the apparent field of view is varied upon zooming.

In the telescopic zoom lens system of the present invention, when the third lens group 30 as the zooming lens group is moved along the optical axis, the diopter is varied. The change in the diopter can be adjusted by either;

(a) arranging the first lens group 10 to be a diopter adjusting lens group which is made moveable along the optical axis; or (b) arranging one of the prisms 51 and 52 of the erecting optical system 50 to be a diopter adjusting optical element which is made moveable along the optical axis.

In the case of item (b), there is an advantage that the overall length of the telescopic zoom lens system (the distance from the most object-side surface of the objective lens group to the most operator's-eye-side surface of the eyepiece lens group) is not varied.

Condition (1) is for maintaining the change in the eye relief upon zooming smaller. By satisfying this condition, the pupil magnification (D-ent./D-ext.; D-ent: the diameter of the entrance pupil; D-ext: the diameter of the exit pupil) of the third lens group 30 can be maintained in the proximity of 1, and the change in the exit pupil due to the movement of the third lens group 30 is made smaller. Further, the positional change of the exit pupil of the fourth lens group 40 can be maintained smaller.

If $|f2/f3|$ exceeds the upper or lower limit of condition (1), the pupil magnification of the third lens group 30 largely deviates from 1, and the change in the eye relief becomes larger.

Condition (2) relates to the miniaturization of the entire lens system. By satisfying this condition, the focal length of the objective lens group can be made shorter, because in the telescopic zoom lens system, the focal length of the first lens group is made shorter by the second and third lens groups. Consequently, the fourth lens group which is the eyepiece lens system can be constituted without making the focal length thereof longer. According to the above described arrangement, the overall length of the entire lens system can be made shorter, and the diameter of the eyepiece lens group can be made smaller.

If (m2w×m3w) exceeds the upper limit of condition (2), the reduction ratios of the second and third lens group are small, so that the fourth lens group is made larger.

If (m2w×m3w) exceeds the lower limit of condition (2), the space between the first and second lens groups becomes too small, so that the erecting optical system cannot be provided therebetween.

Condition (3) relates to a case where the third lens group is constituted by a single lens element. By satisfying this condition, the magnification of the second and third lens groups can be properly shared by these lens groups. Therefor the change in aberrations can be made smaller even if the third lens group is constituted by a single lens element.

If (m2t×m3w)/(m2w×m3t) exceeds the upper limit of condition (3), the magnification shared by the second lens group becomes too large, and thereby the change in aberrations becomes larger.

If (m2t×m3w)/(m2w×m3t) exceeds the lower limit of condition (3), the magnification shared by the third lens group becomes too large, and thereby the change in aberrations becomes larger.

Furthermore, in order to make the change in aberrations (in particular, distortion and astigmatism) smaller, it is preferable for the third lens group to employ an aspherical surface in which the surface shape is changed in a direction along which the thickness of a lens element is reduced toward the periphery with respect to the paraxial spherical surface as a reference. Moreover, the second lens group is preferably constituted by a positive lens element and a negative lens element in order to correct axial chromatic aberration.

In addition, with a pair of the objective lens groups and a pair of the eyepiece lens groups, the telescopic zoom lens system of the present invention can be used in binoculars. In such a case, at least a part of the fourth lens groups which constitute a pair of the eyepiece lens groups is preferably made to be an lens element which is moveable along the optical axis in order to adjust the difference of the diopters of an operator's right and left eyes. In the OE-ZOOM lens system of the prior art, the final lens element, i.e., the most operator's eye-side lens element, of the eyepiece lens group cannot have strong power. Therefore the final lens element is not suitable for a diopter adjusting lens element. Further, in the case where another lens group in the eyepiece lens group, or a lens group in the objective lens group, is arranged to be a diopter adjusting lens element, even if a diopter difference is adjusted, the adjusted diopters for the right and left eyes deviate due to a zooming operation.

In the telescopic zoom lens system of the present invention applied to binoculars, sufficient positive power for adjusting the difference of the diopters of an operator's right and left eyes can be given to the fourth lens groups constituting the eyepiece lens groups. Therefore by performing the diopter difference adjusting operation with the fourth lens group, no deviation from the adjusted diopters will occur. Further, in order to reduce deviation of the right and left angular magnifications (difference of magnification), the fourth lens group is preferably divided into a positive G4A sub-lens group and a positive G4B sub-lens group in this order from the object. The positive G4A sub-lens group is positioned on the side of the object with respect to the primary image forming plane of the objective lens group, while the positive G4B sub-lens group is arranged to be a diopter difference adjusting lens group. In this case, by reducing the absolute value of the resultant power of the second, third and positive G4A lens groups over the entire zooming range, the change in the angular magnification due to deviation of the primary image forming plane can be reduced. This change in the angular magnification occurs, for example, in the case where focusing is performed by the first lens group and a diopter adjusting operation is performed by the positive G4B sub-lens group, Specific numerical data of the embodiments will be described hereinafter. In the diagrams of chromatic aberration (axial chromatic aberration) represented by spherical aberration, the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines; S designates the sagittal image; M designates the meridional image: ER designates the diameter of the exit pupil; and B designates the apparent field of view (°). In the tables of the following embodiments, W designates the real field of view (°), R designates the radius of curvature of each lens surface, d designates the lens thickness or the distance between the lens elements, $N_d$ designates the refractive index at the d-line, and v designates the Abbe number. In each lens arrangement, the position indicated by the dotted lines is the primary image forming plane of the objective lens group.

Figure 23:
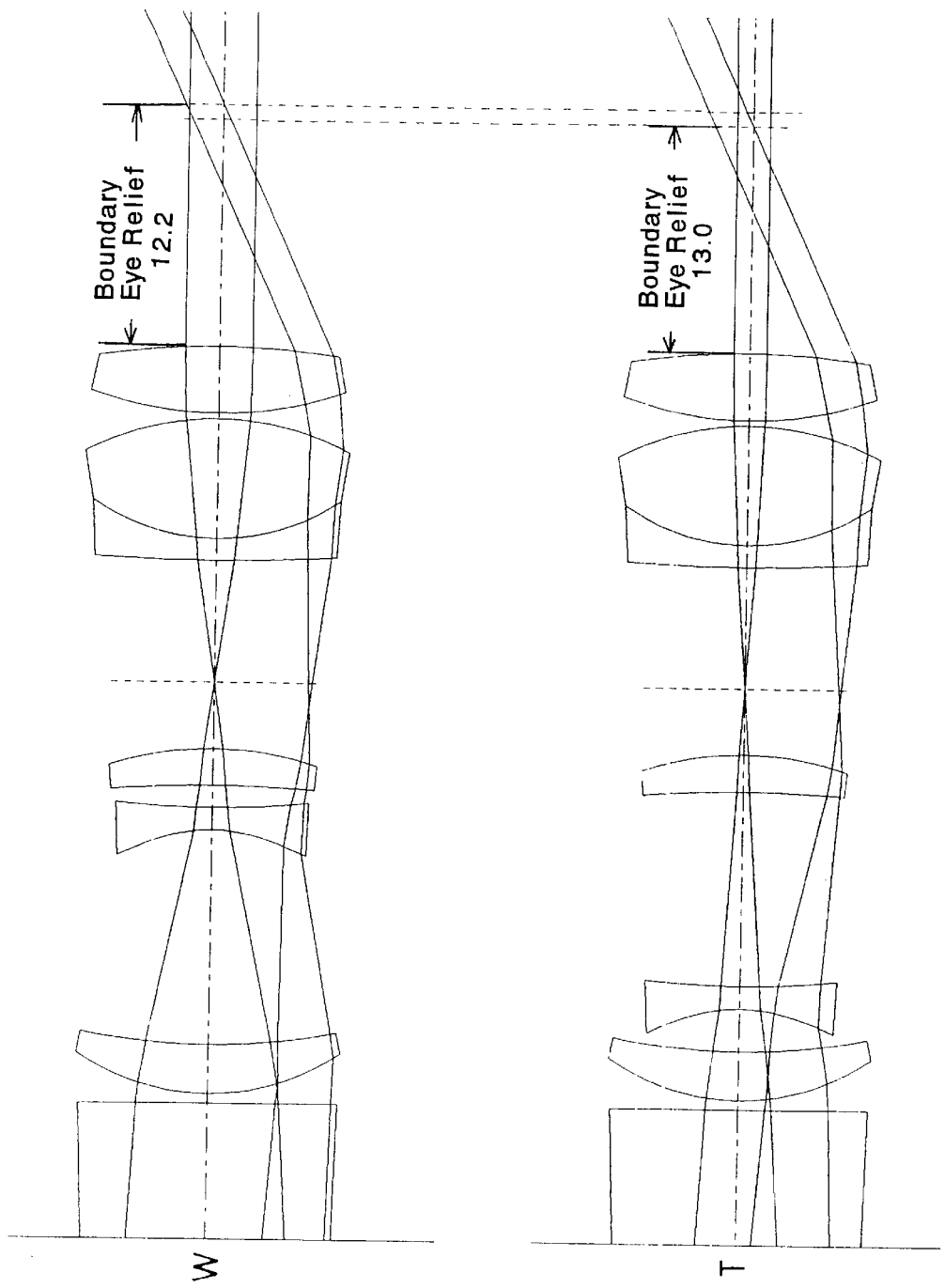
FIG. 23 is an explanatory view which indicates a boundary eye relief of the telescopic zoom lens system according to the present invention.

The eye relief designates the distance from the final lens surface to the exit pupil of the final lens group. Further, the distance from the final lens surface to the intersecting point of the most peripheral light ray of the most marginal bundle of rays and the optical axis is defined as a boundary eye relief (refer to FIG. 23).

In addition to the above, an aspherical surface which is symmetrical with respect to the optical axis is defined as follows:

$$x = Ch^2/\{1+[1-(1+K)C^2h^2]^{1/2}\} + A4h^4 + A6h^6 + A8h^8 + A10h^{10} \ldots ;$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient;

[Embodiment 1]

FIGS. 1 and 3 are the lens arrangement of the first embodiment of a telescopic zoom lens system, at a magnification of 5.0 and 10.0. FIGS. 2A through 2D, and FIGS. 4A through 4D show aberration diagrams of the lens arrangements shown in FIGS. 1 and 3. Table 1 shows the numerical data thereof. Surface Nos. 1 through 3 represent the positive first lens group 10; surface Nos. 4 through 7 represent the erecting optical system 50; surface Nos. 8 and represent the positive second lens group 20; surface Nos. 10 and 11 represent the negative third lens group 30; and surface Nos. 12 through 18 represent the positive fourth lens group 40. The first lens group 10 includes a cemented sub-lens group having a positive lens element and a negative lens element, in this order from the object. The erecting optical system 50 includes two triangle prisms 51 and 52 (surface Nos. 4 to 5, and surface Nos. 6 to 7) shown in FIG. 21(A). The second lens group 20 includes a positive single lens element, and the third lens group 30 includes a negative single lens element. The fourth lens group 40 includes a positive lens element, a cemented sub-lens group having a negative lens element and a positive lens element, and a positive lens element. Upon zooming from a low magnification to a high magnification, the third lens group 30 is moved toward the object. For the adjusting of the diopter, the first lens group 10 moves toward the object in accordance with the movement of the third lens group 30 upon zooming from a low magnification to a high magnification.

Furthermore, in the case of binoculars in which a pair of the telescopic zoom lens systems is provided, each of the fourth lens group 40 is divided into a sub-lens group G4A (surface Nos. 12 and 13) and a sub-lens group G4B (surface Nos. 14 through 18), so that the difference of the diopters of an operator's right and left eyes can be adjusted by moving the sub-lens group G4B.

TABLE 1

| | 5.0 | 10.0 | |
|---|---|---|---|
| Magnification = | 5.0 | 10.0 | |
| W = | 5.2 | 2.5 | |
| Diopter | −1 | −1 | $(m^{-1})$ |
| Boundary Eye Relief | 13.0 | 12.2 | |

| Surface No. | R | d | Nd | ν |
|---|---|---|---|---|
| 1 | 39.066 | 4.00 | 1.51633 | 64.1 |
| 2 | −40.857 | 1.50 | 1.59551 | 39.2 |
| 3 | 783.786 | 9.21–29.98 | — | — |
| 4 | ∞ | 34.00 | 1.56883 | 56.3 |
| 5 | ∞ | 0.50 | — | — |
| 6 | ∞ | 30.00 | 1.56883 | 56.3 |
| 7 | ∞ | 0.50 | — | — |
| 8 | 12.307 | 2.63 | 1.49700 | 81.6 |
| 9 | 37.161 | 11.58–2.28 | — | — |
| 10* | −8.00 | 1.20 | 1.49176 | 57.4 |
| 11 | 47.361 | 1.22–10.52 | — | — |
| 12 | −65.693 | 1.94 | 1.58913 | 61.2 |
| 13 | −17.037 | 10.04 | — | — |
| 14 | 111.047 | 1.20 | 1.78472 | 25.7 |
| 15 | 11.503 | 6.47 | 1.60311 | 60.7 |
| 16 | −14.920 | 0.30 | — | — |
| 17 | 20.577 | 3.50 | 1.69680 | 55.5 |
| 18 | −43.205 | — | — | — |

*designates the aspherical surface which is rotationally symmetrical with respect to the optical axis.

Aspherical surface data
(the aspherical surface coefficients not indicated are zero (0.00))

| Surface No. | K | A4 | A6 |
|---|---|---|---|
| 10 | −1.00 | $0.3059 \times 10^{-3}$ | $-0.6489 \times 10^{-6}$ |

TABLE 2

| | 5.0 | 10.0 | |
|---|---|---|---|
| Magnification = | 5.0 | 10.0 | |
| W = | 5.1 | 2.5 | |
| Diopter | −1 | −1 | $(m^{-1})$ |
| Boundary Eye Relief | 13.5 | 11.0 | |

| Surface No. | R | d | Nd | ν |
|---|---|---|---|---|
| 1 | 47.161 | 4.00 | 1.51823 | 59.0 |
| 2 | −48.935 | 1.50 | 1.60342 | 38.0 |
| 3 | 705.736 | 22.71–45.15 | — | — |
| 4 | ∞ | 34.00 | 1.56883 | 56.3 |
| 5 | ∞ | 3.20 | — | — |
| 6 | ∞ | 30.00 | 1.56883 | 56.3 |
| 7 | ∞ | 0.80 | — | — |
| 8 | 13.390 | 4.13 | 1.60311 | 60.7 |
| 9 | −27.696 | 1.00 | 1.62004 | 36.3 |
| 10 | 39.075 | 11.17–2.21 | — | — |
| 11* | −8.788 | 1.20 | 1.49176 | 57.4 |
| 12 | 83.392 | 10.08–19.04 | — | — |
| 13 | 34.822 | 3.70 | 1.69680 | 55.5 |
| 14 | −25.282 | 0.30 | — | — |
| 15 | 78.167 | 1.20 | 1.78472 | 25.7 |
| 16 | 10.122 | 6.00 | 1.58913 | 61.2 |
| 17 | −25.777 | 0.30 | — | — |
| 18 | 19.414 | 3.20 | 1.69680 | 55.5 |
| 19 | −398.607 | — | — | — |

*designates the aspherical surface which is rotationally symmetrical with respect to the optical axis.

Aspherical surface data
(the aspherical surface coefficients not indicated are zero (0.00))

| Surface No. | K | A4 | A6 |
|---|---|---|---|
| 11 | −1.00 | $0.3761 \times 10^{-3}$ | $-0.4312 \times 10^{-6}$ |

[Embodiment 2]

FIGS. 5 and 7 are the lens arrangement of the second embodiment of a telescopic zoom lens system, at a magnification of 5.0 and 10.0. FIGS. 6A through 6D, and FIGS. 8A through 8D show aberration diagrams of the lens arrangements shown in FIGS. 5 and 7. Table 2 shows the numerical data thereof. Surface Nos. 1 through 3 represent the positive first lens group 10; surface Nos. 4 through 7 represent the erecting optical system 50; surface Nos. 8 and 10 represent the positive second lens group 20; surface Nos. 11 and 12 represent the negative third lens group 30; and surface Nos. 13 through 19 represent the positive fourth lens group 40. The first lens group 10 includes a cemented sub-lens group having a positive lens element and a negative lens element, in this order from the object. The erecting optical system 50 includes two triangle prisms 51 and 52 (surface Nos. 4 to 5, and surface Nos. 6 to 7) shown in FIG. 21(A). The second lens group 20 includes a cemented sub-lens group having a positive lens element and a negative lens element. The third lens group 30 includes a negative single lens element. The fourth lens group 40 includes a positive lens element, a cemented sub-lens group having a negative lens element and a positive lens element, and a positive lens element. Upon zooming from a low magnification to a high magnification, the third lens group 30 is moved toward the object. For the adjusting the diopter, the first lens group 10 moves toward the object in accordance with the movement of the third lens group 30 upon zooming from a low magnification to a high magnification.

[Embodiment 3]

Figure 9:
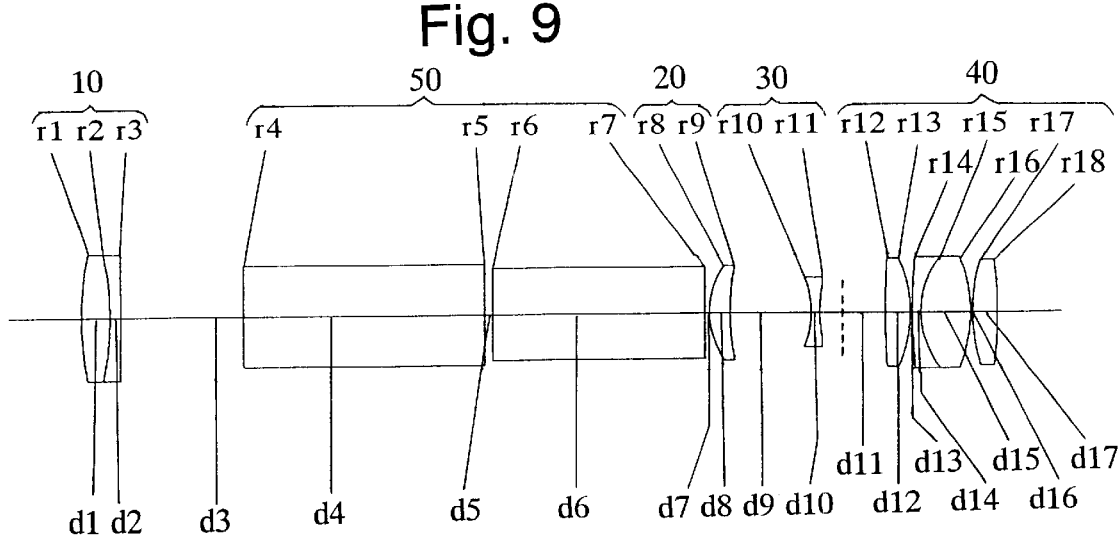
FIG. 9 is a lens arrangement of a third embodiment of a telescopic zoom lens system, at an angular magnification of 5, according to the present invention.
Figures 10A, 10B, 10C, 10D:
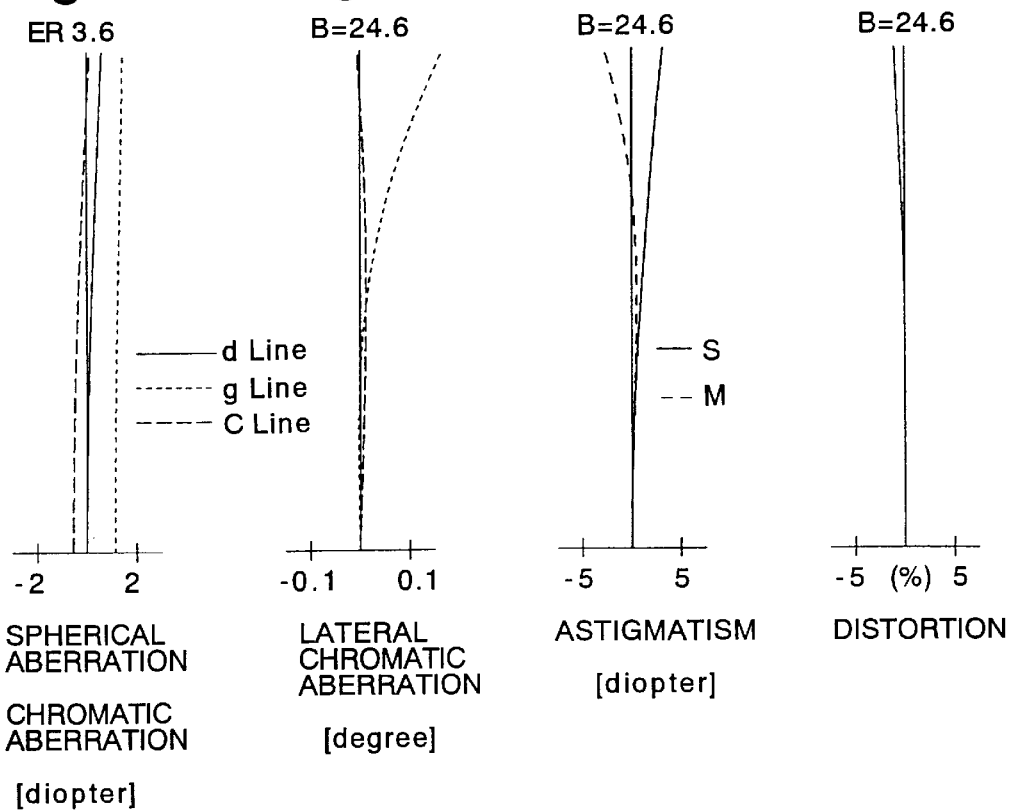
FIGS. 10A, 10B, 10C and 10D show aberration diagrams of the lens arrangement shown in FIG. 9.

FIGS. 9 and 11 are the lens arrangement of the third embodiment of a telescopic zoom lens system, at a magnification of 5.0 and 10.0. FIGS. 10A through 10D, and FIGS. 12A through 12D show aberration diagrams of the lens arrangements shown in FIGS. 9 and 11. Table 3 shows the numerical data thereof. Surface Nos. 1 through 3 represent the positive first lens group 10; surface Nos. 4 through 7 represent the erecting optical system 50; surface Nos. 8 and 9 represent the positive second lens group 20; surface Nos. 10 and 11 represent the negative third lens group 30; and surface Nos. 12 through 18 represent the positive fourth lens group 40. The first lens group 10 includes a cemented sub-lens group having a positive lens element and a negative lens element, in this order from the object. The erecting optical system 50 includes two triangle prisms 51 and 52 (surface Nos. 4 to 5, and surface Nos. 6 to 7) shown in FIG. 21(A). The second lens group 20 includes a positive single lens element. The third lens group 30 includes a negative single lens element. The fourth lens group 40 includes a positive lens element, a cemented sub-lens group having a negative lens element and a positive lens element, and a positive lens element. Upon zooming from a low magnification to a high magnification, the third lens group 30 is moved toward the object. For the adjusting the diopter, the prism 51 (surface Nos. 4 to 5) in the erecting optical system 50 moves toward the eyepiece lens group, as shown in FIG. 21(B), in accordance with the movement of the third lens group 30 upon zooming from a low magnification to a high magnification.

TABLE 3

| | Magnification = | 5.0 | 10.0 | |
|---|---|---|---|---|
| | W = | 5.3 | 2.5 | |
| | Diopter | −1 | −1 | (m⁻¹) |
| | Boundary Eye Relief | 15.4 | 12.2 | |

| Surface No. | R | d | Nd | ν |
|---|---|---|---|---|
| 1 | 46.065 | 4.00 | 1.51633 | 64.1 |
| 2 | −42.492 | 1.50 | 1.60342 | 38.0 |
| 3 | −714.368 | 17.40–26.40 | — | — |
| 4 | ∞ | 34.00 | 1.56883 | 56.3 |
| 5 | ∞ | 1.10–10.10 | — | — |
| 6 | ∞ | 30.00 | 1.56883 | 56.3 |
| 7 | ∞ | 0.65 | — | — |
| 8 | 11.709 | 2.93 | 1.48749 | 70.2 |
| 9 | 34.046 | 11.51–1.87 | — | — |
| 10 | −12.694 | 1.20 | 1.49176 | 57.4 |
| 11* | 18.395 | 9.33–18.96 | — | — |
| 12 | 116.642 | 3.50 | 1.58913 | 61.2 |
| 13 | −19.086 | 0.300 | — | — |
| 14 | 78.105 | 1.20 | 1.78472 | 25.7 |
| 15 | 12.713 | 7.00 | 1.58913 | 61.2 |
| 16 | −20.889 | 0.30 | — | — |
| 17 | 26.526 | 3.50 | 1.69680 | 55.5 |
| 18 | −70.511 | — | — | — |

*designates the aspherical surface which is rotationally symmetrical with respect to the optical axis.

Aspherical surface data
(the aspherical surface coefficients
not indicated are zero (0.00))

| Surface No. | K | A4 | A6 |
|---|---|---|---|
| 11 | −1.00 | 0.3120 × 10⁻³ | −0.1654 × 10⁻⁵ |

[Embodiment 4]

FIGS. 13 and 15 are the lens arrangement of the fourth embodiment of a telescopic zoom lens system, at a magnification of 5.0 and 10.0. FIGS. 14A through 14D, and FIGS. 16A through 16D show aberration diagrams of the lens arrangements shown in FIGS. 13 and 15. Table 4 shows the numerical data thereof. Surface Nos. 1 through 3 represent the positive first lens group 10; surface Nos. 4 through 7 represent the erecting optical system 50; surface Nos. 8 and 9 represent the positive second lens group 20; surface Nos. 10 and 11 represent the negative third lens group 30; and surface Nos. 12 through 18 represent the positive fourth lens group 40. The first lens group 10 includes a cemented sub-lens group having a positive lens element and a negative lens element, in this order from the object. The erecting optical system 50 includes two triangle prisms 51 and 52 (surface Nos. 4 to 5, and surface Nos. 6 to 7) shown in FIG. 21(A). The second lens group 20 includes a positive single lens element. The third lens group 30 includes a negative single lens element. The fourth lens group 40 includes a positive lens element, a cemented sub-lens group having a negative lens element and a positive lens element, and a positive lens element. Upon zooming from a low magnification to a high magnification, the third lens group 30 is moved toward the object. For the adjusting the diopter, the prism 51 (surface Nos. 4 to 5) in the erecting optical system 50 moves toward the eyepiece lens group, as shown in FIG. 21(B), in accordance with the movement of the third lens group 30 upon zooming from a low magnification to a high magnification.

TABLE 4

| | Magnification = | 5.0 | 10.0 | |
|---|---|---|---|---|
| | W = | 5.1 | 2.4 | |
| | Diopter | −1 | −1 | (m⁻¹) |
| | Boundary Eye Relief | 15.2 | 12.2 | |

| Surface No. | R | d | Nd | ν |
|---|---|---|---|---|
| 1 | 45.701 | 4.00 | 1.51633 | 64.1 |
| 2 | −41.039 | 1.50 | 1.59551 | 39.2 |
| 3 | −1053.642 | 13.55–23.35 | — | — |
| 4 | ∞ | 34.00 | 1.56883 | 56.3 |
| 5 | ∞ | 1.77–11.57 | — | — |
| 6 | ∞ | 30.00 | 1.56883 | 56.3 |
| 7 | ∞ | 1.00 | — | — |
| 8 | 13.836 | 2.55 | 1.48749 | 70.2 |
| 9 | 41.975 | 14.00–1.75 | — | — |
| 10 | −105.482 | 1.20 | 1.77250 | 49.6 |
| 11 | 17.944 | 9.74–21.99 | — | — |
| 12 | 74.569 | 3.50 | 1.58913 | 61.2 |
| 13 | −24.383 | 0.30 | — | — |
| 14 | 43.520 | 1.20 | 1.78472 | 25.7 |
| 15 | 11.261 | 6.00 | 1.58913 | 61.2 |
| 16 | −24.413 | 0.30 | — | — |
| 17 | 23.178 | 3.50 | 1.69680 | 55.5 |
| 18 | −71.053 | — | — | — |

[Embodiment 5]

Figure 17:
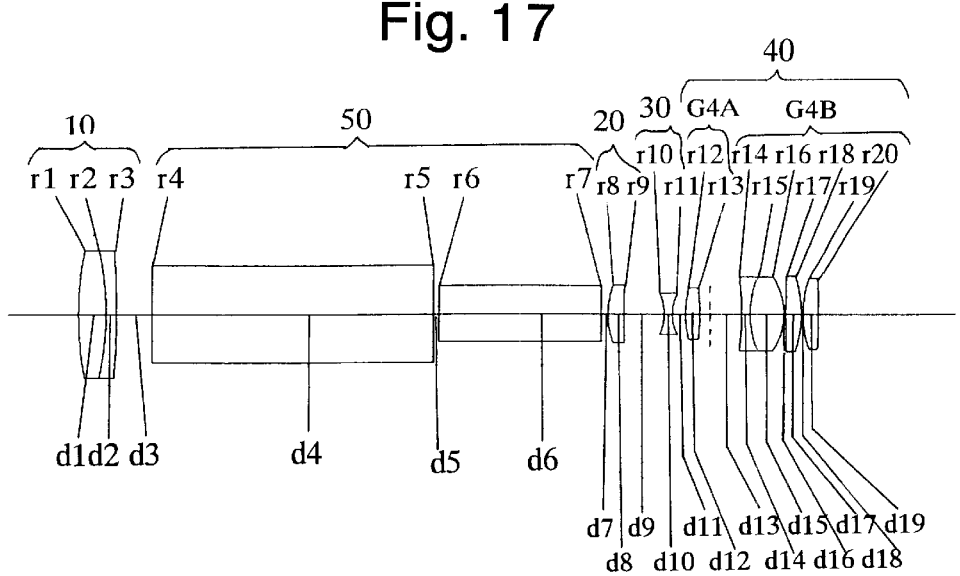
FIG. 17 is a lens arrangement of a fifth embodiment of a telescopic zoom lens system, at an angular magnification of 6.1, according to the present invention.
Figure 18A:
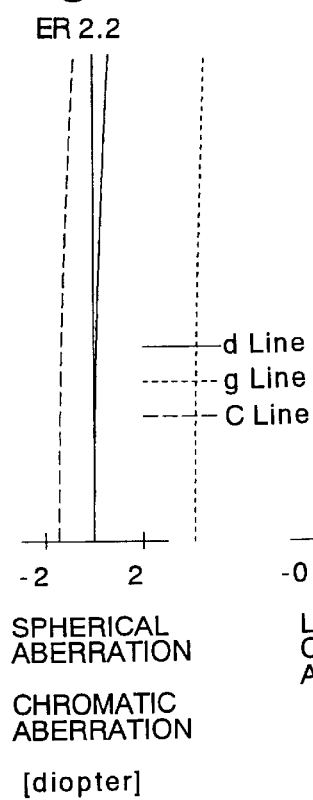
FIGS. 18A, 18B, 18C and 18D are aberration diagrams of the lens arrangement shown in FIG. 17.
Figure 18B:
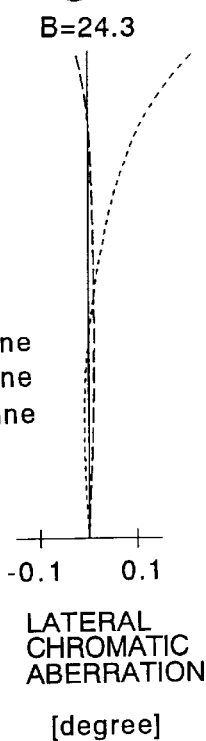
Figure 18C:
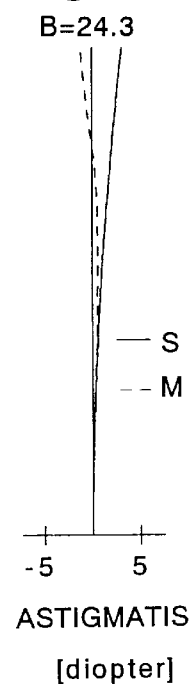
Figure 18D:

FIGS. 17 and 19 are the lens arrangement of the fifth embodiment of a telescopic zoom lens system, at a magnification of 6.1 and 11.8. FIGS. 18A through 18D, and FIGS. 20A through 20D show aberration diagrams of the lens arrangements shown in FIGS. 17 and 19. Table 5 shows the numerical data thereof. Surface Nos. 1 through 3 represent the positive first lens group 10; surface Nos. 4 through 7 represent the erecting optical system 50; surface Nos. 8 and 9 represent the positive second lens group 20; surface Nos. 10 and 11 represent the negative third lens group 30; and surface Nos. 12 through 20 represent the positive fourth lens group 40. The first lens group 10 includes a cemented sub-lens group having a positive lens element and a negative lens element, in this order from the object. The erecting optical system 50 includes two triangle prisms 51 and 52 (surface Nos. 4 to 5, and surface Nos. 6 to 7) shown in FIG. 21(A). The second lens group 20 includes a positive single lens element. The third lens group 30 includes a negative single lens element. The fourth lens group 40 includes a positive lens element, a cemented sub-lens group having a negative lens element and a positive lens element, and a positive lens element. Upon zooming from a low magnification to a high magnification, the third lens group 30 is moved toward the object. For the adjusting the diopter, the first lens group 10 moves toward the object in accordance with the movement of the third lens group 30 upon zooming from a low magnification to a high magnification.

In the case where binoculars are formed by combining two telescopic zoom lens systems, each of the fourth lens groups 40 is divided into a front G4A lens group (surface Nos. 12 to 13) and a rear G4B lens group (surface Nos. 14 to 20). By moving the rear G4B lens group, the difference of the diopters of an operator's right and left eyes can be adjusted.

TABLE 5

| | Magnification = | 6.1 | 11.8 | |
|---|---|---|---|---|
| | W = | 4.2 | 2.0 | |
| | Diopter | −1 | −1 | (m⁻¹) |
| | Boundary Eye Relief | 10.3 | 8.5 | |

| Surface No. | R | d | Nd | ν |
|---|---|---|---|---|
| 1 | 50.000 | 4.00 | 1.51633 | 64.1 |
| 2 | −38.330 | 1.50 | 1.66680 | 33.0 |

TABLE 5-continued

| | | | | |
|---|---|---|---|---|
| 3 | −110.000 | 5.08–21.15 | — | — |
| 4 | ∞ | 40.31 | 1.56883 | 56.3 |
| 5 | ∞ | 0.82 | — | — |
| 6 | ∞ | 23.53 | 1.51633 | 64.1 |
| 7 | ∞ | 1.00 | — | — |
| 8 | 11.041 | 2.35 | 1.69680 | 55.5 |
| 9 | 84.000 | 5.95–2.02 | — | — |
| 10* | −5.637 | 1.20 | 1.49176 | 57.4 |
| 11 | 6.742 | 1.90–5.83 | — | — |
| 12 | 15.478 | 2.10 | 1.58913 | 61.2 |
| 13 | −29.702 | 6.10 | — | — |
| 14 | −37.050 | 1.20 | 1.84666 | 23.8 |
| 15 | 12.953 | 4.90 | 1.58913 | 61.2 |
| 16 | −9.600 | 0.30 | — | — |
| 17 | 199.500 | 2.27 | 1.58913 | 61.2 |
| 18 | −16.750 | 0.30 | — | — |
| 19 | 16.750 | 2.22 | 1.58913 | 61.2 |
| 20 | −77.480 | — | — | — |

*designates the aspherical surface which is rotationally symmetrical with respect to the optical axis.

Aspherical surface data
(the aspherical surface coefficients not indicated are zero (0.00))

| Surface No. | K | A4 | A6 |
|---|---|---|---|
| 10 | −1.95 | $0.1301 \times 10^{-2}$ | $-0.2078 \times 10^{-4}$ |

Figure 22:
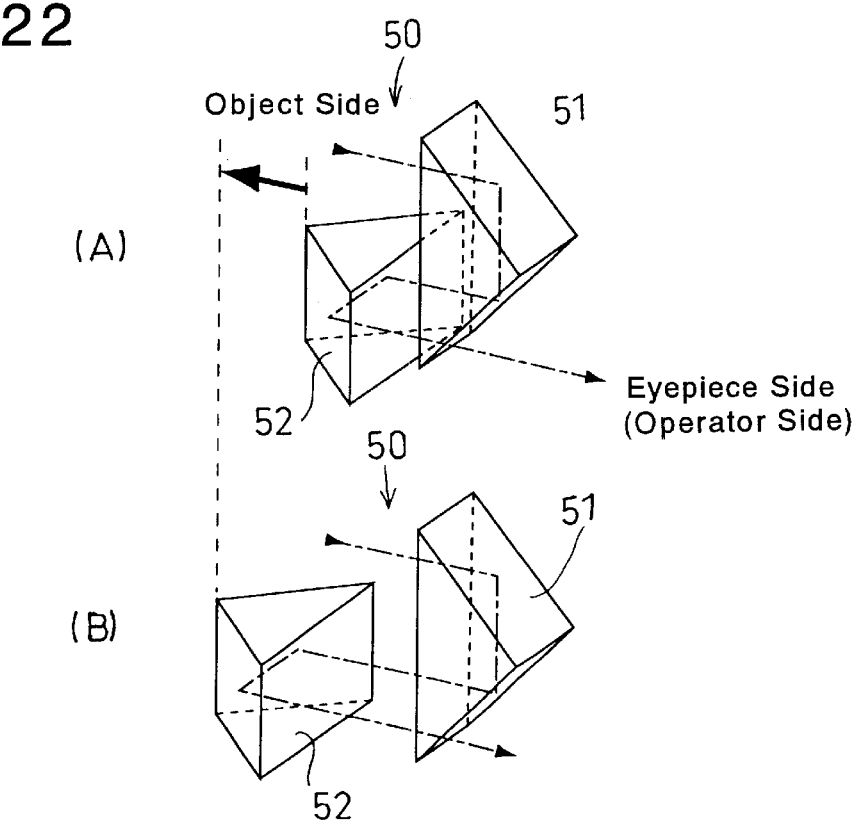
FIGS. 22A and 22B show positions of the triangle prisms which constitute the erecting optical system of a telescopic zoom lens system according to the present invention.

In the third and fourth embodiments, the triangle prism 51 of the image-erecting optical system 50 is moved toward the eyepiece optical system in order to adjust the diopter; however, as shown in FIGS. 22A and 22B, the triangle prism 52 can be moved toward the object.

Table 6 shows the numerical values of each condition of each embodiment.

TABLE 6

| | Condition (1) | Condition (2) | Condition (3) |
|---|---|---|---|
| Embodiment 1 | 2.59 | 0.710 | 0.952 |
| Embodiment 2 | 2.01 | 0.512 | 0.965 |
| Embodiment 3 | 2.33 | 0.622 | 9.890 |
| Embodiment 4 | 2.08 | 0.606 | 0.869 |
| Embodiment 5 | 2.98 | 0.855 | 1.168 |

As can be understood from Table 6, each embodiment satisfies each condition; and as can be understood from the aberration diagrams, aberrations are adequately corrected.

According to the above description, a telescopic zoom lens system in which the apparent field of view is not varied upon zooming can be obtained.

What is claimed is:

1. A telescopic zoom lens system of a minimum magnification of more than two, comprising a positive objective lens group, and a positive eyepiece lens group, in this order from an object;

wherein a portion of said objective lens group comprises a zooming lens group which is moveable along the optical axis upon zooming and is positioned on the side of the object with respect to the primary image forming plane of said objective optical system, and wherein all lenses of the eyepiece lens group are stationary upon zooming.

2. The telescopic zoom lens system according to claim 1, wherein said objective lens group comprises a positive first lens group, a positive second lens group and a negative third lens group, in this order from said object;

wherein said eyepiece lens group comprises a positive fourth lens group;

wherein said zooming lens group comprises said third lens group; and wherein said first lens group is adapted to be a diopter adjusting element which is made moveable along the optical axis in order to adjust the change in the diopter which is occurred when said third lens group is moved.

3. The telescopic zoom lens system according to claim 2, wherein said first lens group is made interchangeable.

4. The telescopic zoom lens system according to claim 2, wherein the following conditions are satisfied:

$$1.7 < |f2/f3| < 3.5$$

$$0.4 < m2w \times m3w < 0.9$$

wherein f2 designates the focal length of said second lens group;

f3 designates the focal length of said third lens group;

m2w designates the lateral magnification of said second lens group when the angular magnification of the entire zoom lens system is the minimum; and m3w designates the lateral magnification of said third lens group when the angular magnification of the entire zoom lens system is the minimum.

5. The telescopic zoom lens system according to claim 4, wherein the following condition is satisfied:

$$0.7 < (m2t \times m3w)/(m2w \times m3t) < 1.3$$

wherein m2t designates the lateral magnification of said second lens group when the angular magnification of the entire zoom lens system is the maximum; and m3t designates the lateral magnification of said third lens group when the angular magnification of the entire zoom lens system is the maximum.

6. The telescopic zoom lens system according to claim 2, wherein a pair of said objective lens groups, and a pair of said eyepiece lens groups are provided in binoculars; and wherein at least a part of either one of said fourth lens groups comprises a diopter-difference adjusting lens element which is moveable along the optical axis.

7. The telescopic zoom lens system according to claim 1, wherein said objective lens group comprises a positive first lens group, an erecting optical system having a plurality of reflection surfaces, a positive second lens group, and a negative third lens group, in this order from said object;

wherein said eyepiece lens group comprises a positive fourth lens group;

wherein said zooming lens group comprises said third lens group; and wherein a part of said erecting optical system is adapted to be a diopter adjusting element which is made moveable along the optical axis in order to adjust the change in the diopter which is occurred when said third lens group is moved.

8. The telescopic zoom lens system according to claim 7, wherein said diopter adjusting element of said erecting optical system comprises a triangle prism.

9. The telescopic zoom lens system according to claim 1, an apparent field of view of said zoom lens system being maintained constant during zooming.

10. A telescopic zoom lens system of a minimum magnification of more than two, comprising a positive objective lens group, and a positive eyepiece lens group, in this order from an object;

wherein a zooming lens group which is moveable along the optical axis upon zooming is positioned on the side of the object with respect to the primary image forming plane of said objective optical system, said zooming lens group comprising a lens group of said objective lens group, and wherein all lenses of the eyepiece lens group are stationary upon zooming.

11. The telescopic zoom lens system according to claim 10, wherein said objective lens group comprises a positive first lens group, a positive second lens group and a negative third lens group, in this order from said object;

wherein said eyepiece lens group comprises a positive fourth lens group;

wherein said zooming lens group comprises said third lens group; and wherein said first lens group is adapted to be a diopter adjusting element which is moveable along the optical axis in order to adjust a change in diopter which occurs when said third lens group is moved.

12. The telescopic zoom lens system according to claim 11, wherein said diopter adjusting element of said erecting optical system comprises a triangle prism.

13. The telescopic zoom lens system according to claim 9, wherein said first lens group is interchangeable.

14. The telescopic zoom lens system according to claim 9, wherein the following conditions are satisfied:

$$1.7 < |f2/f3| < 3.5$$

$$0.4 < m2w \times m3w < 0.9$$

wherein f2 designates the focal length of said second lens group;

f3 designates the focal length of said third lens group;

m2w designates the lateral magnification of said second lens group when the angular magnification of the entire zoom lens system is the minimum; and m3w designates the lateral magnification of said third lens group when the angular magnification of the entire zoom lens system is the minimum.

15. The telescopic zoom lens system according to claim 14, wherein the following condition is satisfied:

$$0.7 < (m2t \times m3w)/(m2w \times m3t) < 1.3$$

wherein m2t designates the lateral magnification of said second lens group when the angular magnification of the entire zoom lens system is the maximum; and m3t designates the lateral magnification of said third lens group when the angular magnification of the entire zoom lens system is the maximum.

16. The telescopic zoom lens system according to claim 11, wherein a pair of said objective lens groups, and a pair of said eyepiece lens groups are provided in binoculars; and wherein at least a part of either one of said fourth lens groups comprises a diopter-difference adjusting lens element which is moveable along the optical axis.

17. The telescopic zoom lens system according to claim 10, wherein said objective lens group comprises a positive first lens group, an erecting optical system having a plurality of reflection surfaces, a positive second lens group, and a negative third lens group, in this order from said object;

wherein said eyepiece lens group comprises a positive fourth lens group;

wherein said zooming lens group comprises said third lens group; and wherein a part of said erecting optical system comprises a diopter adjusting element which is moveable along the optical axis in order to adjust a change in diopter which occurs when said third lens group is moved.

18. The telescopic zoom lens system according to claim 10, an apparent field of view of said zoom lens system being maintained constant during zooming.

19. A telescopic zoom lens system having a minimum magnification greater than two, comprising:

a positive objective lens group, said positive objective lens group comprising a positive first lens group, an erecting optical system having a plurality of reflection surfaces, a positive second lens group and a negative third lens group in this order from an object;

a positive eyepiece lens group, said positive eyepiece lens group comprising a positive fourth lens group, said objective lens group and said eyepiece lens group being arranged in this order from the object;

said third lens group comprising a zooming lens group that is movable along the optical axis for zooming and being positioned on a side of the object with respect to the primary image forming plane of said objective optical system; and a portion of said erecting optical system being configured as a diopter adjusting element which is movable along the optical axis in order to adjust a change in diopter which occurs when said third lens group is moved.

* * * * *